US012646441B2

(12) United States Patent
Yoon et al.

(10) Patent No.: US 12,646,441 B2
(45) Date of Patent: Jun. 2, 2026

(54) LIGHT EMITTING DISPLAY DEVICE AND MANUFACTURING METHOD THEREOF

(71) Applicant: Samsung Display Co., LTD., Yongin-si (KR)

(72) Inventors: Ju-Won Yoon, Yongin-si (KR); Jung-Hun Noh, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/443,554

(22) Filed: Feb. 16, 2024

(65) Prior Publication Data

US 2024/0346984 A1 Oct. 17, 2024

(30) Foreign Application Priority Data

Apr. 14, 2023 (KR) ........................ 10-2023-0049387

(51) Int. Cl.
*G09G 3/20* (2006.01)
*G09G 3/32* (2016.01)

(52) U.S. Cl.
CPC ....... *G09G 3/32* (2013.01); *G09G 2300/0842* (2013.01); *G09G 2310/0267* (2013.01); *G09G 2320/043* (2013.01)

(58) Field of Classification Search
CPC ............. G09G 3/32; G09G 2300/0842; G09G 2310/0267; G09G 2320/043
USPC ............................................................ 345/55
See application file for complete search history.

(56) References Cited

U.S. PATENT DOCUMENTS

2006/0055643 A1* 3/2006 Sato ..................... G09G 3/3225 345/82
2006/0221012 A1* 10/2006 Ikeda ................... G09G 3/3233 345/76
2014/0002332 A1* 1/2014 Huang ................. G09G 3/3406 345/82
2015/0091444 A1* 4/2015 Ebisuno ................. H02H 9/044 315/125
2018/0033832 A1* 2/2018 Park ...................... G06F 1/1652
2024/0428723 A1* 12/2024 Mercier ................... G09G 3/32

FOREIGN PATENT DOCUMENTS

JP 2008058446 A 3/2008
JP 2008151991 A 7/2008
KR 100873705 B1 12/2008
KR 1020140099077 A 8/2014
KR 1020170078891 A 7/2017

* cited by examiner

*Primary Examiner* — Jennifer T Nguyen
(74) *Attorney, Agent, or Firm* — CANTOR COLBURN LLP

(57) ABSTRACT

A light emitting display device includes a driving transistor including a control electrode, a floating electrode, a first electrode connected to a driving voltage line; and a second electrode; a second transistor including a gate electrode, a third electrode connected to a data line, and a fourth electrode connected to the control electrode; a storage capacitor including a first storage electrode and a second storage electrode connected to the control electrode; and a light emitting diode (LED) connected to the second electrode of the driving transistor, where the first storage electrode is connected to a storage voltage line electrically separate from the driving voltage line.

8 Claims, 14 Drawing Sheets

| | Initial | Negative-shift | Positive-shift |
|---|---|---|---|
| Average Vth (V) | Va | -0.48 Va | 0.52 Va |
| Vth Dispersion(V) | 4.24 | 0.72 | 0.49 |
| Vth Dispersion change rate | 100% | -83% | -88% |
| SS (V/dec.) | 0.58 | 0.66 | 0.62 |
| SS Dispersion (V/dec.) | 0.021 | 0.025 | 0.022 |

FIG. 13

| | Initial | Negative-shift | Positive-shift |
|---|---|---|---|
| Average Vth (V) | Va | -0.48 Va | 0.52 Va |
| Vth Dispersion(V) | 4.24 | 0.72 | 0.49 |
| Vth Dispersion change rate | 100% | -83% | -88% |
| SS (V/dec.) | 0.58 | 0.66 | 0.62 |
| SS Dispersion (V/dec.) | 0.021 | 0.025 | 0.022 |

LIGHT EMITTING DISPLAY DEVICE AND MANUFACTURING METHOD THEREOF

CROSS-REFERENCE TO RELATED APPLICATION

This application claims priority to Korean Patent Application No. 10-2023-0049387, filed on Apr. 14, 2023, and all the benefits accruing therefrom under 35 U.S.C. § 119, the content of which in its entirety is herein incorporated by reference.

BACKGROUND

1. Field

The present disclosure relates to a light emitting display device and a manufacturing method thereof.

2. Description of the Related Art

A display device is a device that may display a screen, and a display device may include a liquid crystal display (LCD), an organic light emitting diode (OLED), which is a kind of a light emitting display device, and the like. A display device may be used in various electronic devices such as, for example, a mobile phone, a navigation device, a digital camera, an electronic book, a portable game machine, and various terminals.

A display device such as, for example, a light emitting display device may have a structure in which the display device may be bent or folded using a flexible substrate.

The pixel structure used in light emitting display devices is being developed in various directions.

SUMMARY

Example embodiments described herein support the manufacture of a light emitting display device having an increased number of pixels per unit area by reducing the number of transistors included per pixel.

Example embodiments described herein support improving dispersion characteristics of a driving transistor by applying a voltage to a gate electrode (or a control electrode) of a driving transistor in a manufacturing step of a light emitting display device, in which the voltage difference between the applied voltage and a voltage at another electrode of a driving transistor is relatively large (e.g., above a threshold value).

A light emitting display device according to an embodiment includes a driving transistor including a control electrode, a floating electrode, a first electrode connected to a driving voltage line, and a second electrode; a second transistor including a gate electrode, a third electrode connected to a data line, and a fourth electrode connected to the control electrode; a storage capacitor including a first storage electrode and a second storage electrode connected to the control electrode; and a light emitting diode connected to the second electrode of the driving transistor, wherein the first storage electrode is connected to a storage voltage line electrically separate from the driving voltage line.

In one or more embodiments, a pixel of the set of pixels may consist of the driving transistor, the second transistor, the storage capacitor, and the light emitting diode. For example, the pixel may include the driving transistor, the second transistor, the storage capacitor, and the light emitting diode and be absent a compensation transistor.

In one or more embodiments, the light emitting diode (LED) may include an anode and a cathode, the anode may be connected to the second electrode of the driving transistor, and the cathode may be connected to a driving low voltage line.

In one or more embodiments, the light emitting display device may include a data pad connected to the data line; a first test pad associated with a driving voltage line and connected to the driving voltage line; a second test pad associated with a storage voltage line and connected to the storage voltage line; and a third test pad associated with a driving low voltage line and connected to the driving low voltage line.

In one or more embodiments, the data pad, the first test pad associated with the driving voltage line, the second test pad associated with the storage voltage line, and the third test pad associated with the driving low voltage line may be positioned in a non-display area of the light emitting display device.

In one or more embodiments, the light emitting display device may include a first connection wiring associated with the driving voltage line, wherein the first connection wiring connects the driving voltage line and the first test pad associated with the driving voltage line and is positioned in the non-display area; a second line connection wiring associated with the storage voltage line, wherein the second connection wiring connects the storage voltage line and the second test pad associated with the storage voltage line and is positioned in the non-display area; and a third connection wiring associated with the driving low voltage line, wherein the third connection wiring connects the driving low voltage line and the third test pad associated with the driving low voltage line and is positioned in the non-display area may be further included.

In one or more embodiments, the light emitting display device may include a plurality of driving voltage lines connected to the first connection wiring associated with the driving voltage line, a plurality of storage voltage lines connected to the second connection wiring associated with the storage voltage line, and a plurality of driving low voltage lines connected to the third connection wiring associated with the driving low voltage line.

In one or more embodiments, the light emitting display device may include a scan line connected to the gate electrode of the second transistor; and a scan signal generator connected to the scan line may be further included.

A manufacturing method of a light emitting display device according to an embodiment includes applying a voltage to a plurality of test pads positioned in a non-display area of a display panel in association with performing a high-voltage aging, wherein the display panel includes a plurality of pixels positioned in a display area of the display panel, and each pixel of the plurality of pixels includes a driving transistor and a light emitting diode; the driving transistor includes a control electrode, a floating electrode, a first electrode, and a second electrode; and the high-voltage aging includes applying a first voltage to the control electrode of the driving transistor, applying a second voltage to the first electrode of the driving transistor, and applying a third voltage to one electrode of the light emitting diode, wherein the first voltage has a first voltage value ranging from −100V to −50V, the second voltage has a second voltage value ranging from −10V to 10V, and the third voltage has a third voltage value ranging from −10V to 10V, and the third voltage is equal to the second voltage is smaller than the second voltage by a voltage value ranging from above 0 to 0,5V.

In one or more embodiments, the threshold voltage of the driving transistor may be shifted in a negative direction through the high-voltage aging.

In one or more embodiments, in the high-voltage aging, positive charges positioned in a channel of the driving transistor may be transferred to the floating electrode by a tunneling effect.

In one or more embodiments, each pixel may further include a second transistor. In one or more embodiments, the second transistor may include a gate electrode, a third electrode connected to a data line, and a fourth electrode connected to the control electrode. In one or more embodiments, the first voltage may be provided through the data line.

In one or more embodiments, the second voltage may be provided to the first electrode of the driving transistor through a driving voltage line, and the third voltage may be provided to the cathode of the light emitting diode through a driving low voltage line.

In one or more embodiments, the pixel may further include a storage capacitor, a first storage electrode of the storage capacitor may be connected to a storage voltage line, and a second storage electrode is connected to the control electrode. In one or more embodiments, in the high-voltage aging, a voltage equal to the first voltage or different from the first voltage by up to 10% of the first voltage may be applied to the first storage electrode.

In one or more embodiments, the method may include an additional aging after the high-voltage aging. In one or more embodiments, in the additional aging, a fourth voltage may be applied to the control electrode of the driving transistor, the second voltage may be applied to the first electrode, and the third voltage may be applied to the second electrode. In one or more embodiments, the fourth voltage may be opposite in a polarity to the first voltage and a voltage value ranging from 20V to 60V.

In one or more embodiments, the threshold voltage of the driving transistor may be shifted in a positive direction through the additional aging.

In one or more embodiments, the fourth voltage may be provided through the data line.

In one or more embodiments, the first voltage, the second voltage, the third voltage, the fourth voltage, and the voltage applied to the first storage electrode may be generated by an external voltage generator and provided through pads positioned in the non-display area of the light emitting display device.

In one or more embodiments, the method may include performing, after the high-voltage aging and the additional aging, a visual inspection; a module process of attaching a driving chip (D-IC) a printed circuit board (PCB), or both to the display panel; and an optical compensation wherein the optical compensation may include applying a signal and a data voltage to each pixel to check a displayed luminance and adjusting the data voltage corresponding to the displayed luminance.

In one or more embodiments, the method may include performing a TFT aging, wherein a reliability of the driving transistor prior to the TFT aging is different from a second reliability of the driving transistor after the TFT aging.

According to one or more embodiments, a pixel may include two transistors and one capacitor, and the driving transistor (of the two transistors) has a structure including a floating electrode. In one or more embodiments, in the manufacturing step, the dispersion characteristic of the driving transistor is improved by applying a voltage having a relatively large voltage difference to the gate electrode. Accordingly, for example, each pixel may be absent a separate compensation transistor, which may thereby support reducing the area occupied by each pixel and forming a light emitting display device with an increased number of pixels per unit area (e.g., compared to other light emitting display devices).

According to one or more embodiments of the present disclosure, a pixel may include a driving transistor, and the driving transistor may include a floating electrode and a gate electrode (or control electrode). In one or more embodiments, techniques described herein include applying a voltage having a large voltage difference for the other electrode of the driving transistor to the gate electrode (or control electrode) in the manufacturing step of the light emitting display device, which may thereby improve the dispersion characteristic of the driving transistor. The techniques described herein support the formation of a pixel without further including a separate compensation transistor.

BRIEF DESCRIPTION OF THE DRAWINGS

FIG. 11 to FIG. 13 are views showing a characteristic change of a driving transistor of FIG. 10 in accordance with aspects of the present disclosure.

DETAILED DESCRIPTION

Figure 1:
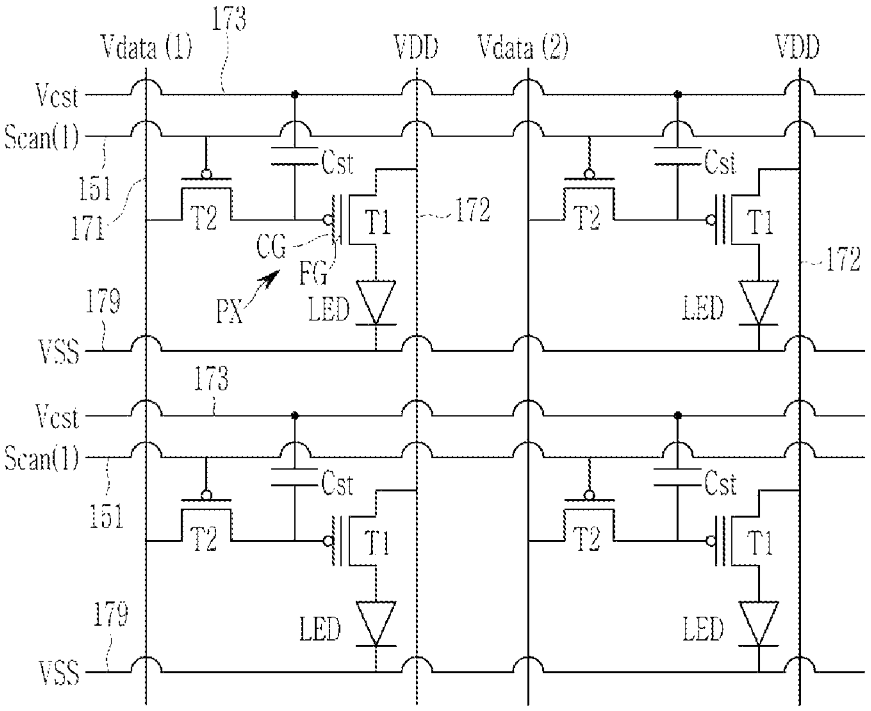
FIG. 1 is an equivalent circuit diagram of four pixels included in an embodiment of a light emitting display device in accordance with aspects of the present disclosure.

Aspects of the present disclosure will be described more fully hereinafter with reference to the accompanying drawings, in which embodiments supported by the present disclosure are shown. As those skilled in the art would realize, the described embodiments may be modified in various different ways, all without departing from the spirit or scope of the present disclosure.

In order to clarify example aspects of the present disclosure, parts that are not connected with the description will be omitted, and the same elements or equivalents are referred to by the same reference numerals throughout the specification.

Further, since sizes and thicknesses of constituent members shown in the accompanying drawings are arbitrarily given for better understanding and ease of description, example aspects of the present disclosure are not limited to the illustrated sizes and thicknesses. In the drawings, the thickness of layers, films, panels, regions, etc., are exaggerated for clarity. In the drawings, for better understanding and ease of description, thicknesses of some layers and areas are excessively displayed.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise", and variations such as "comprises" or "comprising", will be understood to imply the inclusion of stated elements but not the exclusion of any other elements.

Further, in the specification, the phrase "on a plane" means when an object portion is viewed from above, and the phrase "on a cross-section" means when a cross-section taken by vertically cutting an object portion is viewed from the side.

In addition, in the specification, when referring to "connected to", this does not only mean that two or more constituent elements are directly connected, but also that two or more constituent elements are electrically connected through other constituent elements as well as being indirectly connected and being physically connected, or it may mean that they are referred to by different names according to a position or function, but are integrated.

Also, throughout the specification, when it is said that parts such as wires, layers, films, areas, plates, and constituent elements are "extended in the first direction or second direction", this does not mean only a straight-line shape extending straight in the corresponding direction, but it is a structure that extends overall along the first direction or the second direction, includes a structure that is bent and has a zigzag structure in a part, or includes extending while including a curved line structure.

In addition, electronic devices including display devices and display panels described in the specification (e.g., mobile phones, TV, monitors, laptop computers, etc.) or display devices and electronic devices including display panels, etc. manufactured by the manufacturing method described in the specification are not excluded from the right range of this specification.

First, a circuit structure of a pixel according to an embodiment is described with reference to FIG. 1.

FIG. 1 is an equivalent circuit diagram of four pixels included in a light emitting display device in accordance with aspects of the present disclosure.

FIG. 1 includes a circuit structure of four pixels PX, and each pixel PX includes two transistors T1 and T2, one capacitor Cst, and a light emitting diode (LED) LED. Here, the transistors T1 and T2, and the capacitor Cst, excluding the light emitting diode LED, constitute a pixel circuit part, and each pixel PX may include the pixel circuit part and the light emitting diode LED.

The pixel PX according to FIG. 1 includes a plurality of transistors T1 and T2, a storage capacitor (Cst; hereinafter, referred to as a first capacitor), and a light emitting diode LED, which are connected to several wirings (scan line 151, data line 171, driving voltage line 172, storage voltage line 173, and driving low voltage line 179). In the embodiment of FIG. 1, the plurality of transistors T1 and T2 may all be p-type transistors. In the present embodiment, the p-type transistor may include a silicon semiconductor such as a polycrystalline semiconductor or an oxide semiconductor. The p-type transistor may be a transistor that is turned on when a relatively low voltage is applied to the gate electrode.

A plurality of wirings (scan line 151, data line 171, driving voltage line 172, storage voltage line 173, and driving low voltage line 179) is connected to each pixel PX. The plurality of wirings includes a scan line 151, data line 171, driving voltage line 172, storage voltage line 173, and driving low voltage line 179.

The scan line 151 may transmit a scan signal (Scan 1, Scan 2) (later illustrated at FIG. 4) to the gate electrode of the second transistor T2, and sequentially provide a low voltage capable of turning on the second transistor T2 for each row. The data line 171 is a wire that transmits a data voltage (Vdata 1, Vdata 2) (later illustrated at FIG. 4) generated by a data driver (not shown). In an example, based on the data voltage (Vdata 1, Vdata 2) at the gate electrode of the second transistor T2, the magnitude of the light emitting current provided to the light emitting diode LED changes, and thus the luminance of the light emitting diode LED changes.

The driving voltage line 172 provides a driving voltage VDD, the storage voltage line 173 transmits a storage voltage Vcst, and the driving low voltage line 179 transmits a driving low voltage VSS. In some embodiments, when displaying an image, the driving voltage VDD, the storage voltage Vcst, and the driving low voltage VSS may each have different voltage values, or according to some other embodiments, the driving voltage VDD and the storage voltage Vcst may have the same voltage value. In some examples, when displaying an image, the driving voltage VDD, the storage voltage Vcst, and the driving low voltage VSS may have constant voltage values that do not fluctuate. According to an embodiment, the voltage of the control electrode of the driving transistor T1 may be initialized or varied by changing the voltage value of the storage voltage Vcst. The same driving voltage VDD, storage voltage Vcst, and driving low voltage VSS may be applied to all pixels PX.

The driving transistor T1 (also referred to as a first transistor) is a p-type transistor and, different from the second transistor T2, further includes a floating electrode FG. The driving transistor T1 includes a control electrode CG (hereinafter referred to as a gate electrode or a driving gate electrode), the floating electrode FG, a first electrode, and a second electrode. In an example, one of the first electrode and the second electrode may be a source electrode and the other may be a drain electrode. The control electrode CG of driving transistor T1 receives the data voltage (Vdata 1, Vdata 2) from the second transistor T2 and is connected to an electrode (hereinafter, referred to as 'a second storage electrode') of the storage capacitor Cst. The floating electrode FG of the driving transistor T1 is floating and is not electrically connected to other electrodes, and may be insulated from other parts by insulating layers (referring to FIG. 2, a first insulating layer 141 and a second insulating layer 142) positioned above and below the floating electrode FG.

The first electrode of the driving transistor T1 may be connected to the driving voltage line 172 to receive the driving voltage VDD, and the second electrode of the driving transistor T1 may be connected to an electrode (an anode) of the light emitting diode LED to output an output current to the light emitting diode LED. The magnitude of the output current that the driving transistor T1 that is output to one electrode (the anode) of the light emitting diode LED is controlled based on the magnitude of the voltage (i.e., the data voltage (Vdata 1, Vdata 2) provided from the second transistor T2 or the voltage stored in the storage capacitor Cst) at the control electrode CG. Therefore, the magnitude of the output current output to an electrode (the anode) of the light emitting diode LED may be adjusted by the data voltage (Vdata 1, Vdata 2) applied to the pixel PX.

The second transistor T2 is a p-type transistor that receives the data voltage (Vdata 1, Vdata 2) into the pixel PX. The gate electrode of the second transistor T2 is connected to the scan line 151, and the first electrode of the second transistor T2 is connected to the data line 171. The second electrode of the second transistor T2 is connected to the control electrode CG of the driving transistor T1 and the second storage electrode of the storage capacitor Cst. When the second transistor T2 is turned on by a negative voltage (a low voltage) of the scan signal (Scan 1, Scan 2) provided through the scan line 151, at that time, the data voltage (Vdata 1, Vdata 2) provided through the data line 171 is provided to the control electrode CG of the driving transistor T1, and the data voltage (Vdata 1, Vdata 2) is stored in the second storage electrode of the storage capacitor Cst.

According to an embodiment, at least one of the transistors T1 and T2 is positioned between the semiconductor layer and the substrate, and may have an overlapping electrode overlapping each channel. In an example, the overlapping electrode may be electrically connected to the control electrode or the gate electrode of the overlapping transistor, and in some aspects, the overlapping electrode may serve as another gate electrode.

The first storage electrode of the storage capacitor Cst is connected to the storage voltage line 173 that transmits the storage voltage Vcst, and the second storage electrode is connected to the control electrode CG of the driving transistor T1 and the second electrode of the second transistor T2. The storage capacitor Cst may serve to keep the voltage of the control electrode CG of the driving transistor T1 constant during one frame.

An electrode (the anode) of the light emitting diode LED is connected to the second electrode of the driving transistor T1, and the other electrode (a cathode) of the light emitting diode LED is connected to the driving low voltage line 179 that transmits driving low voltage VSS. As a result, the current output from the driving transistor T1 passes through one electrode (the anode) of the light emitting diode LED and is discharged to the other electrode (the cathode) of the light emitting diode LED, and the current flows in the emission layer included in the light emitting diode LED, thereby emitting light.

With reference to the example of FIG. 1, the pixel PX is described as including two transistors T1 and T2 and a capacitor (the storage capacitor Cst). However, aspects of the pixel PX are not limited thereto, and the pixel PX may include a parasitic capacitor. In one or more embodiments, the pixel PX may further include a transistor and a voltage line capable of initializing an electrode (the anode) of the light emitting diode LED or changing the voltage of an electrode (the anode) to a low voltage.

Hereinafter, the schematic cross-sectional structure of the driving transistor T1 having the floating electrode FG is described with reference to FIG. 2.

Figure 2:
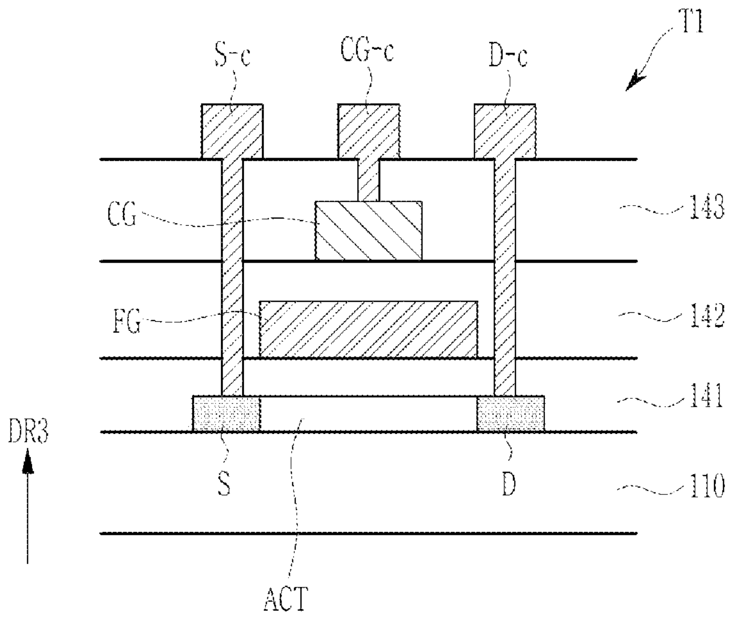
FIG. 2 is a schematic cross-sectional view of an embodiment of a driving transistor included in a light emitting display device in accordance with aspects of the present disclosure.

FIG. 2 is a schematic cross-sectional view of an embodiment of a driving transistor (e.g., driving transistor T1) included in a light emitting display device in accordance with aspects of the present disclosure.

Referring to FIG. 2, driving transistor T1 includes a semiconductor layer ACT, a control electrode CG, and a floating electrode FG, according to an embodiment, and may be connected (e.g., electrically coupled to) to other parts through connecting electrodes CG-c, S-c, and D-c.

Referring to FIG. 2, the semiconductor layer ACT is positioned on the substrate 110. The semiconductor layer ACT may be formed of a silicon semiconductor or an oxide semiconductor such as a polycrystalline semiconductor. In the semiconductor layer ACT, a first region S and a second region D corresponding to the first electrode and the second electrode are positioned on both sides of the channel. The semiconductor layer ACT, except for the channel, may have conductivity characteristics comparable to conductors through ion implantation or a doping process. In some aspects, the first region S and the second region D have conductivity characteristics similar or comparable to the conductors, thereby corresponding to the first electrode and the second electrode. In the example embodiment illustrated at FIG. 2, the channel may be positioned at a portion of the semiconductor layer ACT which overlaps with the floating electrode FG.

A first insulating layer 141 is formed on the semiconductor layer ACT, and the first insulating layer 141 may be formed of an inorganic insulating material.

A first conductive layer including a floating electrode FG may be disposed on the first insulating layer 141. The floating electrode FG is surrounded by insulating layers (a first insulating layer 141 and a second insulating layer 142) positioned above and below, and thus has a structure that is not electrically connected to other external parts.

A second insulating layer 142 is formed on the floating electrode FG, and the second insulating layer 142 may be formed of an inorganic insulating material.

A second conductive layer including a control electrode CG is formed on the second insulating layer 142.

A third insulating layer 143 is formed on the control electrode CG, and the third insulating layer 143 may be formed of inorganic insulating material or organic insulating material.

An opening is formed at the insulating layer of at least a part among the third insulating layer 143, the second insulating layer 142, and the first insulating layer 141. Expressed another way, openings are formed at respective portions of the third insulating layer 143, the second insulating layer 142, and the first insulating layer 141. The openings formed at the second insulating layer 142 and the first insulating layer 141 may expose both sides of the semiconductor layer ACT, respectively, and the opening formed at the third insulating layer 143 may expose the control electrode CG. The floating electrode FG may be electrically isolated from (e.g., may not be electrically connected to) other components outside because the floating electrode FG is not exposed by the openings.

A plurality of connecting electrodes S-c, CG-c, and D-c included in a third conductive layer are disposed on the third insulating layer 143.

The connecting electrode S-c is a connecting electrode that connects the first region S of the semiconductor layer ACT with other parts. For example, referring to FIGS. 1 and 2, connecting electrode S-c may be a connecting electrode electrically connecting the driving voltage line 172 and the first region S of the semiconductor layer ACT. According to an embodiment, the driving voltage line 172 and the first region S of the semiconductor layer ACT may be electrically connected without the connecting electrode S-c.

The connecting electrode D-c is a connecting electrode that connects the second region D of the semiconductor layer ACT to other parts. For example, referring to FIG. 1, connecting electrode D-c may be a connecting electrode electrically connected to one electrode (the anode) of the light emitting diode LED.

The connecting electrode CG-c is a connecting electrode that connects the control electrode CG to other parts. In an example, connecting electrode CG-c may be a connecting electrode that electrically connects the second electrode of the second transistor T2 or the second storage electrode of the storage capacitor Cst and the control electrode CG.

Other example aspects of the structure of the third conductive layer including a plurality of connecting electrodes S-c, CG-c, and D-c, not shown in FIG. 2, are described herein.

On the third conductive layer, an organic layer may be further disposed.

The anode of the LED, which is one electrode of a light emitting diode LED, may be positioned on the organic layer, and the anode may be electrically connected to the connecting electrode D-c through an opening formed in the organic layer. In an example, the output current of the driving transistor T1 may be provided to the anode of the light emitting diode LED from the second region D of the semiconductor layer ACT of the driving transistor T1.

A pixel defining layer having an opening exposing a portion of the anode may be positioned on the anode. An emission layer may be positioned within the opening of the pixel defining layer, and the cathode, which is another electrode of the light emitting diode LED, may be formed on the pixel defining layer and the emission layer. A spacer may also be formed above the pixel defining layer and below the cathode.

An encapsulation layer may be positioned on the cathode, and the encapsulation layer includes at least one inorganic layer and at least one organic layer. According to an embodiment, the encapsulation layer may have a triple layer structure including a first inorganic encapsulation layer, an organic encapsulation layer, and a second inorganic encapsulation layer. The encapsulation layer may provide protection to the emission layer from moisture or oxygen that may inflow from the outside. According to an embodiment, the encapsulation layer may include a structure in which an inorganic layer and an organic layer are sequentially stacked.

In addition, according to an embodiment, a component enabling touch detection may be further disposed on the encapsulation layer, and a component such as a light blocking layer or a color filter may be further included according to an embodiment. According to an embodiment, a color conversion layer including quantum dots may be included, or a reflection control layer may be included instead of a color filter.

According to one or more embodiments of the present disclosure, by using the driving transistor including the floating electrode FG, such as in the example embodiment of FIG. 1, a pixel PX including two transistors T1 and T2 is supported, in which the pixel PX may be implemented without a compensation transistor for compensating for the characteristics (a threshold voltage or a current dispersion) according to the process dispersion of the driving transistor T1. As a result, aspects of the present disclosure provide for a light emitting display device with an increased number of pixels per unit area compared to other light emitting display devices, because the area occupied by each pixel is reduced (e.g., due to the implementation without a compensation transistor).

Tradeoffs of pixels PX that do not include a compensation transistor as described with reference to FIG. 1 include a difference in characteristics (e.g., threshold voltage or current dispersion of the driving transistor T1) due to process dispersion in association with the position of the driving transistor T1, which may result in deterioration of the display. However, according to one or more embodiments supported by the present disclosure, as will be described in detail with reference at least to FIG. 4 and FIG. 10, during the manufacturing process of the panel, the threshold voltage or the current dispersion of the driving transistor T1 may be reduced by applying a voltage to the gate electrode (the control electrode CG) of the driving transistor, in which a voltage difference between the applied voltage and a voltage at another electrode of the driving transistor.

Figure 3:
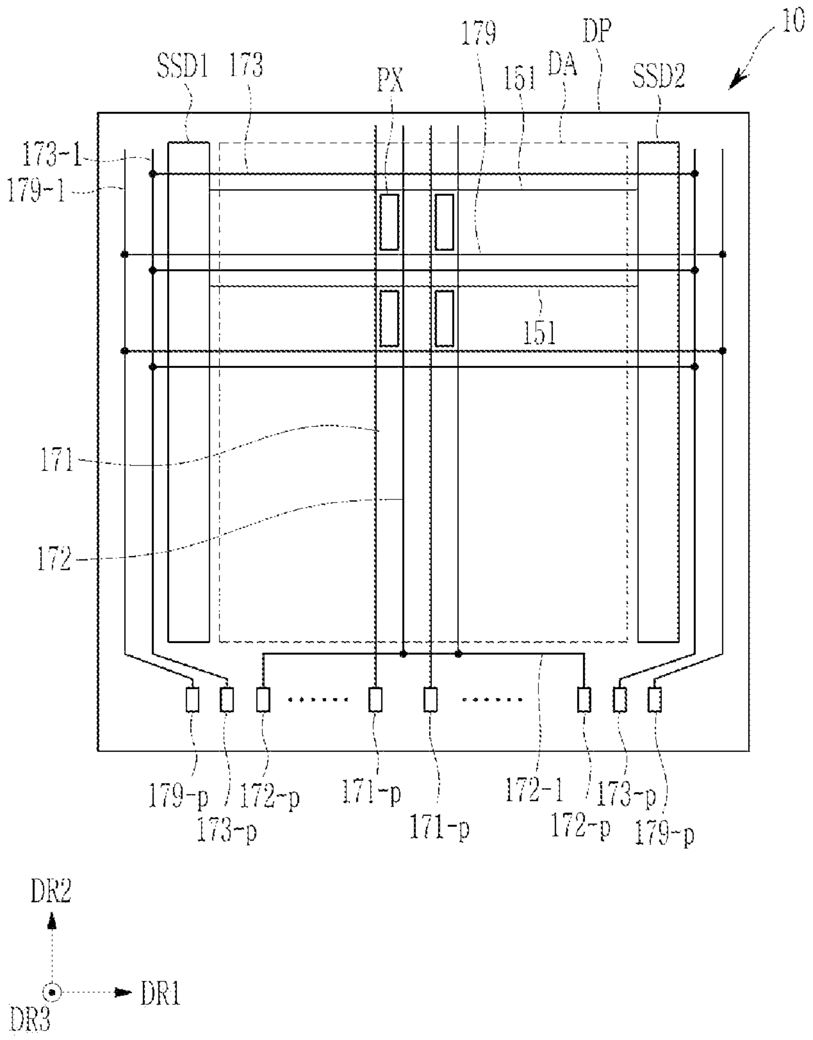
FIG. 3 is a schematic top plan view of an embodiment of a display panel during a manufacture in accordance with aspects of the present disclosure.

Example aspects of how voltage is applied during the panel manufacturing process is described through FIG. 3.

FIG. 3 is a schematic top plan view of a display panel during a manufacture in accordance with aspects of the present disclosure.

Referring to FIG. 3, the display panel 10 during the processing for manufacturing the light emitting display device, the pixel PX is completed, but may have a state that a driving chip or a printed circuit board (PCB) is not attached to drive the pixel PX.

Also, the display panel 10 during the manufacturing process may include test pads 172-*p*, 173-*p*, and 179-*p* and a data pad 171-*p*. In one or more embodiments, in the display panel 10 during the manufacturing process, in addition to the pixel PX, scan signal generators SSD1 and SSD2, which generate scan signals and are connected to a scan line 151, are also formed. The scan signal generators SSD1 and SSD2 may be formed together through the same process when forming the pixel PX.

The structure of FIG. 3 is described in detail as follows.

The display panel 10 during the manufacturing process includes a display area DA and a non-display area positioned around the display area DA. In the non-display area, the scan signal generators SSD1 and SSD2, the test pads 172-*p*, 173-*p*, and 179-*p*, and the data pad 171-*p* are positioned, and connection wirings 172-1, 173-1, and 179-1, which are connected to the test pads 172-*p*, 173-*p*, and 179-*p*, may be further included.

The display area DA, as shown in FIG. 1, is a region where the pixel PX including the light emitting diode LED is positioned, thereby displaying an image. The pixel PX shown as a quadrangle in FIG. 3 schematically shows a region in which a pixel circuit part except for a light emitting diode LED is formed among the pixel. The light emitting diode LED may have various flat shapes and receive a current by being electrically connected to each pixel circuit part.

Each pixel PX, as shown in FIG. 1, is connected to a scan line 151, a data line 171, a driving voltage line 172, a storage voltage line 173, and a driving low voltage line 179.

Referring to FIG. 3, the wirings (scan line 151, data line 171, driving voltage line 172, storage voltage line 173, and driving low voltage line 179) positioned in the display area DA extend to the non-display area and may have a following connection structure in the non-display area, respectively.

The scan line 151 extends in a first direction DR1, extends from the display area DA to the non-display area, and is connected to the scan signal generators SSD1 and SSD2 positioned in the non-display area. Here, the scan signal generators SSD1 and SSD2 are formed at positions adjacent to the display area DA in the non-display area, and may be formed in a pair on both sides of the display area DA. One scan line 151 may receive scan signals of the same timing from the scan signal generators SSD1 and SSD2 positioned on both sides to be provided to the pixel PX. The scan signal applied to the scan line 151 may also be generated from the display panel 10 during the manufacturing process, and at this time, necessary clock signal and control signal from an external voltage generator (referring to FIG. 14 (B) 11) may be provided to the scan signal generators SSD1 and SSD2.

The data line 171 extends in a second direction DR2, extends from the display area DA to the non-display area, and is connected to the data pad 171-*p* of the non-display area. Referring to FIG. 3, one data line 171 is connected to one data pad 171-*p*. The data pad 171-*p* may be connected to one terminal of a driving chip or to a pad of a printed circuit board (PCB) in a subsequent process.

The driving voltage line 172 extends in the second direction DR2, extends from the display area DA to the non-display area, and is connected to the connection wiring 172-1 for a driving voltage line extending in the first direction DR1 in the non-display area. Both ends of the connection wiring 172-1 for the driving voltage line are connected to the test pad 172-*p* for the driving voltage line. Therefore, a plurality of driving voltage line 172 may be connected to one connection wiring 172-1 for the driving voltage line, and the voltage applied to the test pad 172-*p* for the driving voltage line may be applied to the entire driving voltage line 172. The test pad 172-*p* for the driving voltage line may be connected to a pad of a printed circuit board (PCB) in a subsequent process.

The storage voltage line 173 extends in the first direction DR1, extends from the display area DA to the non-display area, and is connected to a pair of the connection wiring 173-1 for the storage voltage line extending in the second direction DR2 in the non-display area. Each end of a pair of the connection wiring 173-1 for the storage voltage line is connected to the test pad 173-*p* for the storage voltage line. Therefore, the plurality of storage voltage line 173 may be connected to the pair of the connection wiring 173-1 for the storage voltage line, and the voltage applied to the test pad 173-*p* for the storage voltage line may be applied to the entire storage voltage line 173. The test pad 173-*p* for the storage voltage line may be connected to a pad of a printed circuit board (PCB) in a subsequent process. The pair of the connection wiring 173-1 for the storage voltage line may be positioned outside the scan signal generators SSD1 and SSD2 in the non-display area, and farther from the display area DA than the scan signal generators SSD1 and SSD2.

The driving low voltage line 179 extends in the first direction DR1, extends from the display area DA to the non-display area, and is connected to a pair of connection wiring 179-1 for the driving low voltage line extending in the non-display area in the second direction DR2. One end of each the pair of connection wiring 179-1 for the driving low voltage line is connected to the test pad 179-*p* for the driving low voltage line. Therefore, the plurality of driving low voltage line 179 may be connected to the pair of connection wiring 179-1 for the driving low voltage line, and the voltage applied to the driving low voltage line test pad 179-*p* may be applied to the entire driving low voltage line 179. The test pad 179-*p* for the driving low voltage line may be connected to a pad of a printed circuit board (PCB) in a subsequent process. The pair of connection wiring 179-1 for the driving low voltage line may be positioned outside the scan signal generators SSD1 and SSD2 in the non-display area, and farther from the display area DA than the scan signal generators SSD1 and SSD2. In one or more embodiments, the driving low voltage line 179 may have a structure extending in the display area DA in the second direction DR1, or may have a structure similar to that of the driving voltage line 172.

Figure 14:
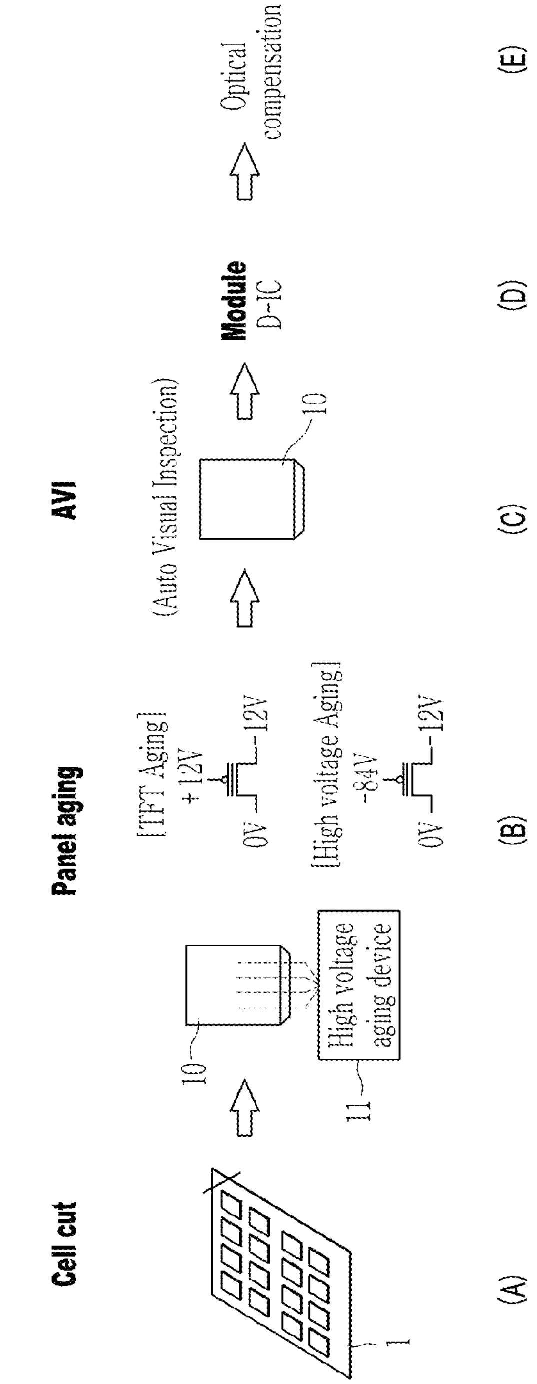
FIG. 14 is a view dividing and showing steps during an embodiment of manufacturing of a light emitting display device in accordance with aspects of the present disclosure.

The test pads 172-*p*, 173-*p*, and 179-*p*, and the data pad 171-*p* receive each voltage from an external voltage generator (referring to FIG. 14 (B) 11) when applying a voltage to reduce a current dispersion in the manufacturing stage of a light emitting display device, and the scan signal generated by the scan signal generators SSD1 and SSD2 may be applied to the scan line 151. The reason why the voltage is applied using the external voltage generator is that there is no part that may apply the voltage because it is a step in the manufacturing process, in addition, this is because the voltage applied to reduce the current dispersion in the manufacturing stage of the light emitting display device uses a voltage of a larger range than the range of the voltage used for an image display. That is, the voltage applied to reduce the current dispersion in the manufacturing step of the light emitting display device may be a voltage outside the voltage range generally used when the light emitting display device is driven to display an image.

Hereinafter, in order to reduce the current dispersion of the driving transistor T1 according to one embodiment, a high-voltage aging performed on the display panel 10 during the manufacturing process is examined in detail with reference to FIG. 4. Here, the meaning of high-voltage may mean that a voltage difference between the voltage of the control electrode CG of the driving transistor T1 and the voltage of the first electrode or the second electrode is large.

Figure 4:
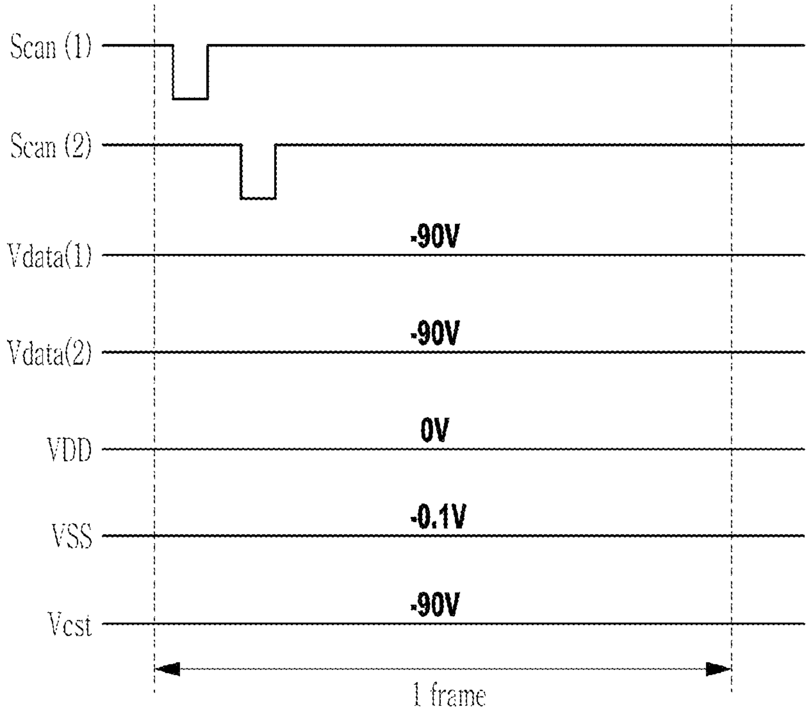
FIG. 4 is a waveform diagram of an embodiment of a signal applied to a display panel during a manufacturing in accordance with aspects of the present disclosure.

FIG. 4 is a waveform diagram of a signal applied to a display panel during manufacturing in accordance with aspects of the present disclosure.

FIG. 4 shows a waveform of each signal and voltage during one frame (e.g., a temporal duration) during a high-voltage aging. Example aspects of the waveforms of FIG. 4 are described with reference to a light emitting display device described herein (e.g., with reference to FIGS. 1 and 3).

Scan signal Scan 1 and scan signal Scan 2 are signals applied to each of two adjacent scan lines 151, and are respectively generated by scan signal generators SSD1 and SSD2 and applied to the scan lines 151. A second transistor T2 is turned on by each scan signal (Scan 1, Scan 2). In an embodiment, for the scan signals (Scan 1 and Scan 2), −90V is a high voltage value and −100V is a low voltage value. However, aspects of the present disclosure are not limited thereto, and various suitable high voltage and low voltage values of the scan signals Scan 1 and Scan 2 for turning off or turning on the second transistor T2 may be used.

Data voltage Vdata 1 and data voltage Vdata 2 are voltages generated by an external voltage generator and may be applied to (provided to) each of two adjacent data lines 171 provided through respective data pads 171-*p*. The data voltages (Vdata 1 and Vdata 2) according to an embodiment may each be a voltage of −90V, but are not limited thereto. As the data voltages Vdata 1 and Vdata 2, a voltage (hereinafter referred to as a first voltage) of −100V or more and −50V or less may be used (e.g., a voltage ranging from −100V to −50V).

In an example, when a low voltage is applied to the scan signal Scan 1 and the scan signal Scan 2, the second transistor T2 is turned on, and the data voltage Vdata 1 and the data voltage Vdata 2 pass through the second transistor T2 and are provided to the control electrode CG of the driving transistor T1.

The driving voltage VDD, the storage voltage Vcst, and the driving low voltage VSS are voltages that are equally applied to the entire display panel.

The driving voltage VDD is applied from an external voltage generator to the test pad 172-*p* for the driving voltage line, and is provided to the driving voltage line 172 through the connection wiring 172-1 for the driving voltage line. A voltage of 0V may be used as the driving voltage VDD according to an embodiment. According to an embodiment, as the driving voltage VDD, a voltage (hereinafter, also referred to as a second voltage) between −10V and 10V may be used.

The storage voltage Vcst is applied from an external voltage generator to the test pad 173-*p* for the storage voltage line, and is provided to the storage voltage line 173 through the pair of the connection wiring 173-1 for the storage voltage line. A voltage of −90V may be used as the storage voltage Vcst according to an embodiment. The storage voltage Vcst may have a voltage value equal to or equivalent to the data voltage Vdata 1 and the data voltage Vdata 2. In some embodiments, the storage voltage Vcst may have a voltage value that differs from the data voltage Vdata 1 and the data voltage Vdata 2 by up to 10%. The storage voltage Vcst may be set such that the storage capacitor Cst does not have the too large voltage difference for the data voltage Vdata 1 and the data voltage Vdata 2 such that a dielectric breakdown does not occur during the high-voltage aging. According to an embodiment, the storage voltage Vcst may be a voltage ranging from −100V to −50V.

The driving low voltage VSS is applied to the test pad 179-*p* for the driving low voltage line from an external voltage generator, and is provided to the driving low voltage line 179 and one electrode (a cathode) of the light emitting diode LED through the pair of connection wirings 179-1 for the driving low voltage line. A voltage of −0.1V may be used as the driving low voltage VSS according to an embodiment. According to an embodiment, the driving voltage VDD may use voltage (hereinafter, also referred to as a third voltage) of −10V or more and 10V or less (expressed another way, a voltage ranging from −10V to 10V).

FIG. 4 shows a waveform of one frame according to an example embodiment, in which the frequency of the scan signal Scan 1 and the scan signal Scan 2 is 60 Hz. According to an embodiment, the frequency of the scan signal Scan 1 and the scan signal Scan 2 are not limited thereto, and the frequency may be any suitable value (e.g., 30 Hz or 120 Hz) supportive of aspects of the present disclosure. Additionally, or alternatively, the high-voltage aging may proceed for a duration of 60 seconds. In some embodiments, the high-voltage aging may be performed for a time period that results in a reduction of the dispersion of the driving transistor T1. In some embodiments, the high-voltage aging may be performed for various times depending on the type of the driving transistor T1. In some embodiments, the high-voltage aging may be performed for a duration of a minimum of 30 seconds and a maximum of 90 seconds (e.g., 30 seconds or more and 90 seconds or less).

An example in which the signals and voltages described with reference to FIG. 4 are applied to a pixel PX of the display panel 10 during the manufacturing process is described with reference to FIG. 5.

Figure 5:
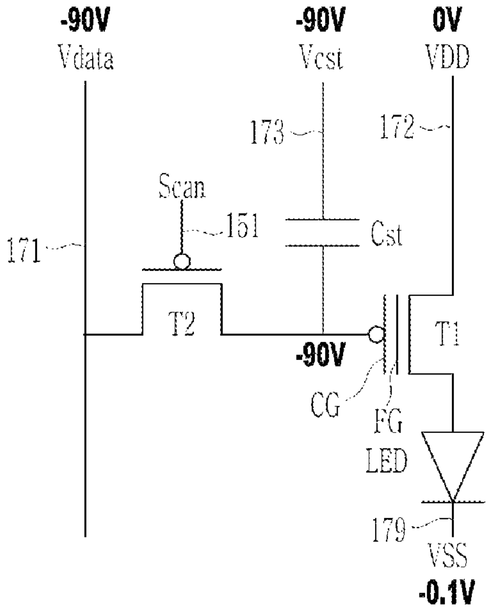
FIG. 5 is a circuit diagram showing a voltage relation in response to an application of signals as described with reference to FIG. 4 to a pixel in accordance with aspects of the present disclosure.

FIG. 5 is a circuit diagram showing a voltage relationship according to an application of a signal of FIG. 4 to a pixel PX in accordance with aspects of the present disclosure.

Referring to FIG. 5, when the second transistor T2 is turned on by the scan signal Scan, the data voltage Vdata of −90V applied to the data line 171 is provided to the control electrode CG of the driving transistor T1 and the second storage electrode of the storage capacitor Cst, and the voltage of −90V is thereby provided to the control electrode CG of the driving transistor T1 and the second storage electrode. The driving voltage VDD of 0V is applied to the first electrode of the driving transistor T1, the storage voltage Vcst of −90V is applied to the first storage electrode of the storage capacitor Cst, and the driving low voltage VSS of −0.1 V is applied to the cathode of the light emitting diode LED. In the example of FIG. 5, the voltage applied to the control electrode CG of the driving transistor T1 may be also referred to as the first voltage, the voltage applied to the first electrode of the driving transistor T1 may be also referred to as the second voltage, and the voltage applied to the second electrode of the driving transistor T1 may also be referred to as the third voltage. Therefore, the first voltage may be the data voltage Vdata applied to the data line 171 during the high-voltage aging, the second voltage may be the driving voltage VDD, and the third voltage may be the driving low voltage VSS.

During high-voltage aging, voltages are applied to the pixel PX in accordance with the example voltage relationship as shown in FIG. 5. The meaning of the term high-voltage described herein means that the voltage difference between the voltage at the control electrode CG of the driving transistor T1 and the voltage at the first electrode or second electrode is large (e.g., above a threshold value). In the present embodiment, since the driving transistor T1 is a p-type transistor, the lower the voltage at the control electrode, the greater the voltage difference. The high-voltage aging may be performed by applying signals and voltages to the display panel 10 in accordance with the example values and waveforms as shown in FIG. 4 during the manufacture as shown in FIG. 3, in which the signals and voltages are applied for a temporal duration of at least 30 seconds and less than 90 seconds (30 seconds or more and 90 seconds or less). For example, the temporal duration associated with one frame as described with reference to FIG. 4 may range from 30 seconds to 90 seconds.

Figure 6:
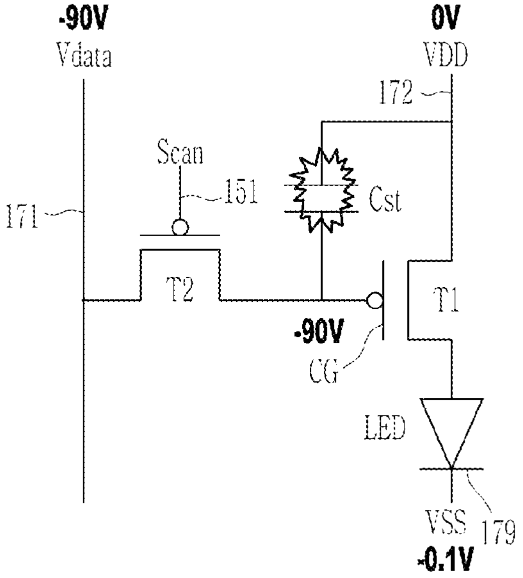
FIG. 6 is a circuit diagram showing a problem associated with an application of signals as described with reference to FIG. 4 to a pixel according to a comparative example.

A comparative example is illustrated in FIG. 6 in which the first storage electrode of the storage capacitor Cst is connected to the driving voltage line 172, and a voltage relationship between components illustrated in FIG. 6 is described with reference to an example in which high-voltage aging of FIG. 4 is applied to FIG. 6.

FIG. 6 is a view showing a problem according to an application of the signals associated with high-voltage aging of FIG. 4 to a pixel according to a comparative example.

Referring to FIG. 6, the voltage difference between two ends of the storage capacitor Cst of the comparative example is very large (e.g., at 90V), and due to the voltage difference, the insulating layer positioned between the first storage electrode and the second storage electrode of the storage capacitor Cst loses an insulating function thereof and an insulation breakdown occurs. Accordingly, for example, and the storage capacitor Cst in a final completed light emitting display device manufactured using the structure of the comparative example may not function properly. Therefore, performing high-voltage aging in the structure of the comparative example would result in a storage capacitor Cst and a light emitting display device which are non-functioning or improperly functioning.

In contrast, in a pixel circuit in accordance with example aspects of the present disclosure (e.g., as described with reference to FIG. 1), the first storage electrode of the storage capacitor Cst is separate from the driving voltage line 172 and may receive a separate voltage. Accordingly, for example, the pixel circuit in accordance with example aspects of the present disclosure supports the application of high-voltage aging by applying the signal and voltage as described with reference to FIG. 4, and the current dispersion of the driving transistor T1 may be eliminated or mitigated.

Figure 7:
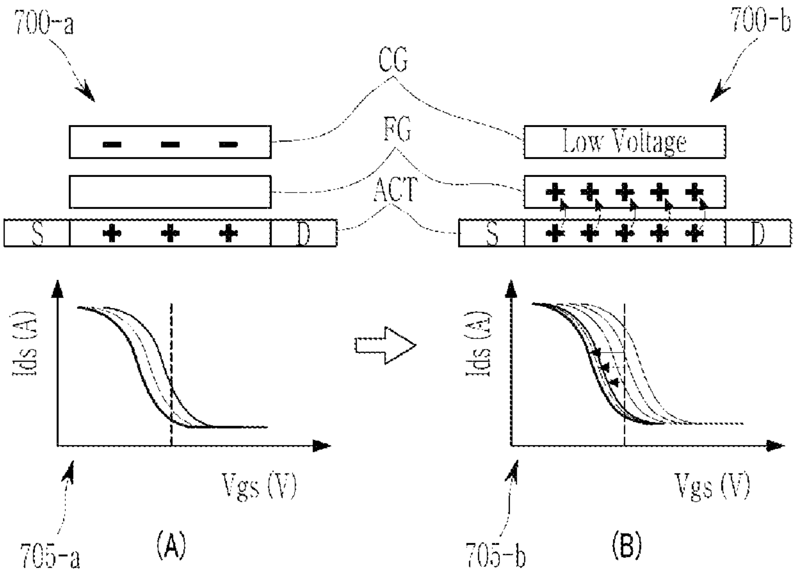
FIG. 7 to FIG. 9 are graphs showing a characteristic change of a driving transistor in response to an application of signals as described with reference to FIG. 4 in accordance with aspects of the present disclosure.
Figure 8:
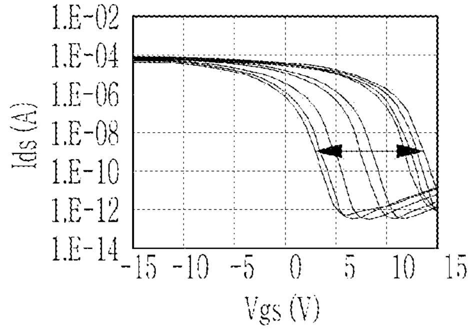
Figure 8:
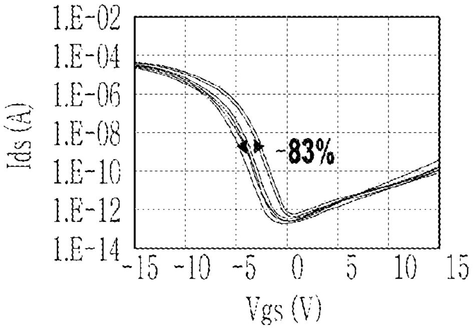
Figure 9:
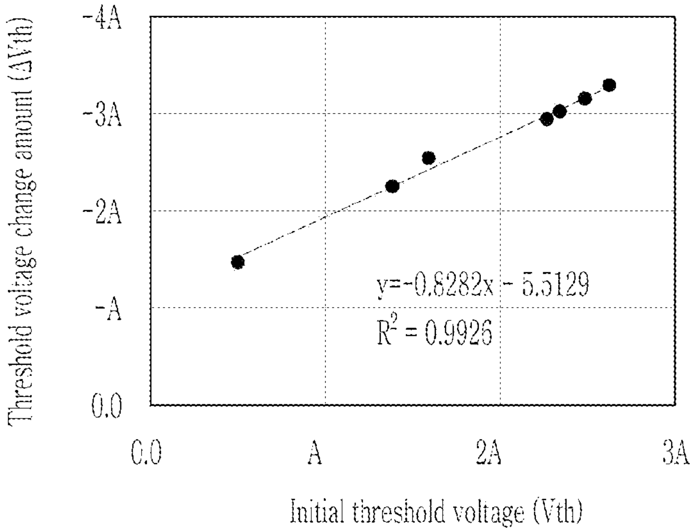

Example aspects of changes that occur in the driving transistor T1 in response to the high-voltage aging are described with respect to FIG. 7 to FIG. 9.

FIG. 7 to FIG. 9 are graphs showing a characteristic change of a driving transistor in response to an application of signals as described with reference to FIG. 4 in accordance with aspects of the present disclosure.

FIG. 7 shows changes in a charge arrangement and a current dispersion of the driving transistor T1 during a high-voltage aging.

(A) shows an initial state in which a voltage is applied to the driving transistor T1 for a high-voltage aging, and (B) shows a changed state of the driving transistor T1 after the high-voltage aging has been applied. (A) and (B) illustrate respective cross-sectional views 700 of the driving transistor T1 in accordance with the initial state and the changed state.

Referring to the cross-sectional view 700-*a* positioned on the upper portion of (A) in FIG. 7, in the state where a hole with a positive charge is positioned in the channel of the semiconductor layer ACT of the driving transistor T1, a very low voltage (e.g., −90V) is applied to the control electrode CG of the driving transistor T1. A voltage of 0V is applied to the first region S, and a voltage of −0.1V is applied to the second region D.

Referring to the graph 705-*a* of (A) in FIG. 7, it may be confirmed that the output current Ids according to the voltage Vgs of the plurality of driving transistors T1 is not constant due to the process dispersion, but there is a dispersion.

Referring to the cross-sectional view 700-*b* positioned on the upper side of (B) in FIG. 7, due to the very low voltage (e.g., −90V) applied to the control electrode CG of the driving transistor T1 and the relatively high voltages (e.g., 0V and −0.1 V, respectively) applied to the first region S and the second region D, it may be confirmed that the positive charges positioned in the channel of the driving transistor are transferred to the floating electrode FG by a Fowler Nordheim Tunneling effect.

Referring to the graph 705-*b* of (B) in FIG. 7, as the floating electrode FG becomes positively charged, the threshold voltage of the channel of the driving transistor T1 shifts in the negative direction (hereinafter referred to as a negative shift). In some aspects, the degree of the negative direction shift of the threshold voltage may differ among the plurality of driving transistors T1 having the dispersion.

The greater the amount of the carriers (the holes or the electrons) in the channel, the greater the amount of the charges tunneled through Fowler Nordheim, and the greater the degree to which the threshold voltage of the driving transistor T1 is shifted in the negative direction. Specifically, if a relatively small amount of the positive charge is present in the channel of the driving transistor T1 due to the process dispersion, the threshold voltage of the corresponding driving transistor T1 has a relatively small voltage value, and the degree of the shift in the negative direction by the tunneling during the high-voltage aging is also relatively small. On the other hand, if a relatively large amount of the positive charge is present in the channel of the driving transistor T1 due to the process dispersion, the threshold voltage of the driving transistor T1 has a relatively large voltage value, and the degree of the shift in the negative direction by the tunneling during the high-voltage aging is also relatively large. The degrees in shift are divided and shown by the arrows (and respective sizes thereof) illustrated in the graph 705-*b* of (B) in FIG. 7. According to the high-voltage aging, the process dispersion is reduced as the threshold voltage values of the driving transistor T1, which have been separated by the process dispersion, are shifted within a certain range. As the threshold voltage value of the driving transistor T1 is positioned within a certain range, the output current of the driving transistor T1 is also within a certain range, and the current dispersion of the driving transistor T1 is reduced.

Example graphs illustrative of the output current (Ids) characteristics corresponding to the voltage Vgs for a plurality of driving transistors T1, in which the characteristics are caused by high-voltage aging described herein, are shown in FIG. 8. Here, the voltage Vgs represents a voltage difference between the control electrode CG of the driving transistor T1 and the first region S or the first electrode of the driving transistor T1.

(A) of FIG. 8 shows the initial state in which the voltage is applied to the driving transistor T1 for the high-voltage aging, and (B) OF FIG. 8 shows a state of the driving transistor T1 after the high-voltage aging has been applied. For the high-voltage aging of FIG. 8, the data voltage of −84V was applied, and the high-voltage aging was performed for 60 seconds. In the example described with reference to FIG. 8, a voltage of 0V was applied to the first region S of the driving transistor T1, and a voltage of −0.1 V was applied to the second region D. Also, a voltage of −84V was applied to the first storage electrode of the storage capacitor Cst.

Referring to (A) of FIG. 8, it may be confirmed that the plurality of driving transistors T1 have a voltage Vgs value generating a constant output current Ids positioned over a wide range due to the process dispersion. In this way, in order to drive the driving transistors T1 of the various dispersions, the data voltages of the various ranges may be implemented, and compensation transistors are implemented (according to some other approaches) included in the pixels to compensate for the various threshold voltages. In contrast, as supported by the aspects of the present disclosure described herein, the dispersion at a pixel may be reduced through the high-voltage aging as shown in (B) of FIG. 8 without adding a compensation transistor to the pixel.

Referring to (B) of FIG. 8, after the high-voltage aging, the dispersion of the plurality of driving transistors T1 is reduced by about 83%, and the range of the value of the voltage Vgs of the plurality of driving transistors generating the constant output current (Ids) is reduced. The example results described with reference to (B) of FIG. 8 support the aspects herein of manufacturing a light emitting display device in which the included pixels are implemented without additional compensation transistors.

FIG. 9 is a graph illustrating a threshold voltage change amount ΔVth after high-voltage aging, based on an initial threshold voltage Vth. Referring to FIG. 9, the initial threshold voltage Vth on the x-axis refers to the threshold voltage before high-voltage aging is applied, and the voltage change amount (ΔVth) on the y-axis indicates how much the threshold voltage changes through the high-voltage aging. In the example of FIG. 9, the y-axis has a negative value, corresponding to the shift of the voltage change amount (ΔVth) in a negative direction. In FIG. 9, A may be an integer.

Referring to FIG. 9, it may be confirmed that as the initial threshold voltage Vth value is large, the amount of change (ΔVth) of the threshold voltage is greatly reduced after the high-voltage aging. That is, the larger the threshold voltage, the larger the reduction, and the smaller the threshold voltage, the smaller the reduction, after performing the high-voltage aging, the threshold voltage values and the output current values of the driving transistor T1 come together within a certain range, thereby the process dispersion is reduced.

For reference, the driving transistor T1 described with reference to FIG. 8 and FIG. 9 has a width W of 3 μm and a length L of 4.7 μm.

Embodiments which proceed with the high-voltage aging have been described herein. In this case, although the dispersion of the threshold voltage of the driving transistor T1 is reduced, as the threshold voltage is shifted in a negative direction, using a data voltage range different from the data voltage range previously used for an image display may further be implemented, example aspects of which are described herein. According to some embodiments described herein, after performing the high-voltage aging, the threshold voltage may be additionally shifted so that the plurality of driving transistor T1 may use the data voltage range previously used for the image display as it is, example aspects of which are described with reference to FIG. 10 to FIG. 13.

Figure 10:
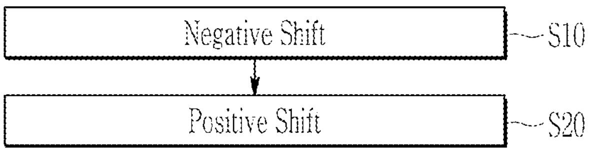
FIG. 10 is a flowchart showing an embodiment of a method for applying a signal to a display panel during a manufacture in accordance with example aspects of the present disclosure.

According to one or more embodiments of the present disclosure, in order to reduce the current dispersion of the driving transistor T1, a method of the high-voltage aging and an additional aging performed on the display panel 10 during the manufacturing process is examined in detail through FIG. 10.

FIG. 10 is a flowchart showing an embodiment of a method for applying a signal to a display panel during manufacture in accordance with example aspects of the present disclosure.

Referring to FIG. 10, applying high-voltage aging to the display panel 10 during the manufacturing process may be performed in two stages.

The method includes applying a first aging S10). The first aging S10 includes aspects of the high-voltage aging described above, which shifts (negative-shifts) the threshold voltage of the driving transistor T1 in a negative direction.

The method includes applying a second aging S20 (also referred to herein as an additional aging). The second aging S20 shifts the threshold voltage of the driving transistor T1 in a positive direction (a positive shift). In the second aging S20, an aging may be performed by applying a voltage (hereinafter referred to as a fourth voltage) having a polarity opposite to that of the data voltage (the first voltage) used in high-voltage aging and a value ranging from 20V to 60V.

In the second aging S20, the signals such as in FIG. 4 may be applied, but the difference is that the fourth voltage different from the data voltage (the first voltage) used in the first aging S10 is used as the value of the data voltages Vdata 1 and Vdata 2 applied to the data line, and the fourth voltage passes through the second transistor T2 and is transferred to the control electrode CG of the driving transistor T1.

In the second aging S20, the threshold voltage of the plurality of driving transistor T1 may use the data voltage range previously used for the image display as-is, and the different voltages may be applied to the data line according to the degree of shifting the threshold voltage in the positive direction (the positive shift).

In one or more embodiments, the first aging S10 and the second aging S20 may each be applied for a duration of a minimum of 30 seconds and a maximum of 90 seconds (e.g., proceed for 30 seconds or more and 90 seconds or less).

In the following, the characteristic changes of the driving transistor T1 based on the two aging processes described with reference to FIG. 10 are examined with reference to FIG. 11 to FIG. 13.

Figure 11:
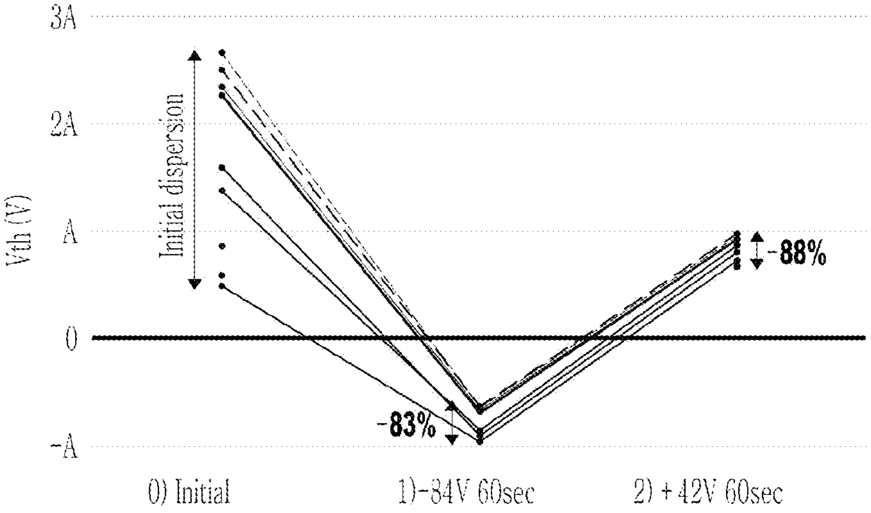
Figure 12:
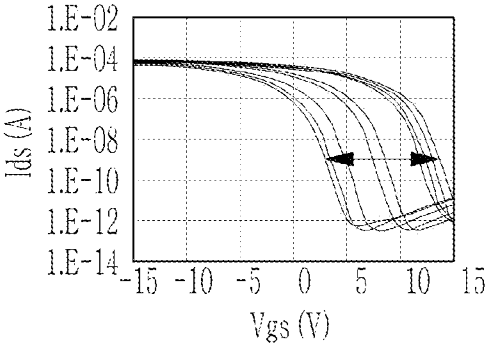
Figure 12:
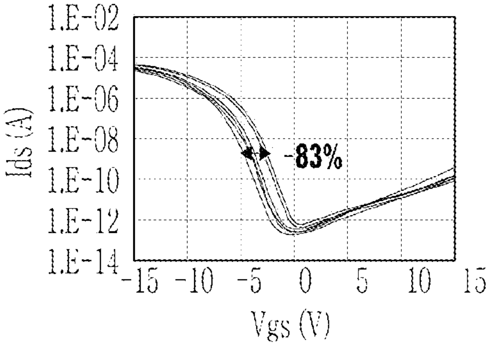
Figure 12:
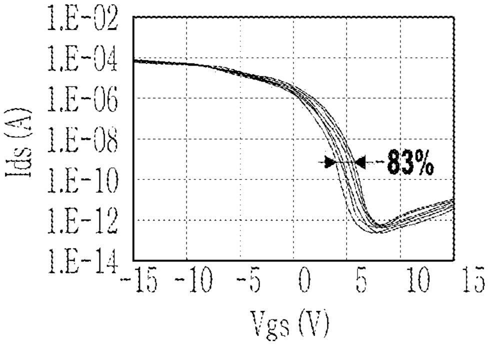

FIG. 11 to FIG. 13 are views showing a characteristic change of a driving transistor of FIG. 10 in accordance with example aspects of the present disclosure.

With reference to FIG. 11 to FIG. 13, in the first aging of S10, −84V was applied as the data voltage, and at this time, a voltage of 0V was applied to the first region S of the driving transistor T1, and a voltage of −0.1V was applied to the second region D. Also, −84V was applied to the first storage electrode of the storage capacitor Cst. The first aging S10 was performed for 60 seconds.

In the second aging S20, +42V was applied as the data voltage, and at this time, a voltage of 0V was applied to the first region S of the driving transistor T1, and a voltage of −0.1 V was applied to the second region D. Also, 42V was applied to the first storage electrode of the storage capacitor Cst. The second aging S20 was also performed for 60 seconds.

For reference, the driving transistor T1 used in FIG. 11 to FIG. 13 had a width (W) of 3 μm and a length (L) of 4.7 μm.

Example aspects of how the threshold voltage of the plurality of driving transistors T1 changes based on the first and second aging is described with reference to FIG. 11.

In FIG. 11, an x-axis represents a time, a y-axis represents the threshold voltage Vth value of the driving transistor T1, and A may be an arbitrary integer.

First, according to the first aging S10, as shown in FIG. 8 above-described, when performing the high-voltage aging, as the threshold voltage Vth of the plurality of driving transistors T1 is shifted in the negative direction, and the dispersion of the threshold voltage Vth is reduced by about 83%, and thereby it may be confirmed that the dispersion range of the threshold voltage Vth is reduced.

After the first again S10, and further, after the second aging S20, as the threshold voltage Vth of the plurality of driving transistors T1 is shifted in the positive direction, the dispersion of the threshold voltage Vth is reduced by a total of 88%, and it may be confirmed that the dispersion range of the threshold voltage Vth is positioned within a narrower range.

FIG. 12 illustrates graphs for the experiment of the output current (Ids) characteristic according to the voltage Vgs of the driving transistor T1 due to the aging as shown in FIG. 8. (A) of FIG. 12 and (B) of FIG. 12 correspond to (A) of FIG. 8 and (B) of FIG. 8. Referring to (B) of FIG. 12, according to the first aging S10, when performing the high-voltage aging, the threshold voltage of the plurality of driving transistor T1 is shifted in the negative direction, and the dispersion is reduced by about 83%, it may be confirmed that the range of the values of the voltage Vgs of the plurality of driving transistors generating the constant output current (Ids) is reduced.

Referring to (C) of FIG. 12, it may be confirmed that the dispersion of the threshold voltage of the plurality of driving transistors T1 is reduced by about 88% by the second aging process S20.

In addition, as the threshold voltage of the plurality of driving transistors T1 after the second aging S20 is shifted in the positive direction, it is shifted to the range of the threshold voltage corresponding to the data voltage range previously used for the image display. As a result, the data voltage range previously used for the image display may be used as it is.

FIG. 13 illustrates an example table representing the threshold voltage Vth and a change of a value SS, in the case of the aging through the two aging stages as described with reference to FIG. 10.

Here, SS stands for a subthreshold slope or a subthreshold swing, as a current-voltage characteristic of a thin film transistor. Thus, SS refers to the magnitude of the voltage applied to the control electrode CG associated with increasing the output current 10 times to the second region D side when a voltage below the threshold voltage Vth is applied to the control electrode CG, and SS is expressed in units of V/dec. (decade). In the case of the driving transistor T1, aspects of the present disclosure support implementations of a relatively large SS, which may be advantageous in order to reduce a luminance deviation due to the dispersion of the voltage applied to the control electrode CG.

Referring to FIG. 13, when the average value of the threshold voltage Vth of the driving transistor T1 has an Initial value Va V before proceeding with two-stage aging, the dispersion value of the threshold voltage Vth was 4.24 V, the SS value was 0.58 V/dec., and the dispersion value of SS was 0.021 V/dec.

After performing the first aging (the negative shift), which is the high-voltage aging, the driving transistor T1 may have the following characteristics.

The average value of the threshold voltage Vth of the driving transistor T1 was shifted in the negative direction by −0.48 Va V, the dispersion value of the threshold voltage Vth was 0.72 V, and the dispersion of the threshold voltage Vth was reduced by 83%. The SS value was increased to 0.66 V/dec., and the dispersion value of SS was also increased to 0.025 V/dec.

After the second aging (the positive shift) is performed, the driving transistor T1 may have following characteristics.

The average value of the threshold voltage Vth) of the driving transistor T1 was shifted in the positive direction by 0.52 Va V, and the dispersion value of the threshold voltage Vth was 0.49 V, compared to before the aging (Initial), the dispersion was reduced by 88%. The value SS is 0.62 V/dec, which is larger than before the aging (Initial), and the dispersion value of SS is 0.022 V/dec., which is larger than that before the aging (Initial).

As described above, through applying two agings as described herein, including one high-voltage aging, the dispersion of the threshold voltage of the driving transistor T1 was further reduced. In accordance with example aspects of the present disclosure, after the threshold voltage is shifted in the negative direction, the threshold voltage is shifted in the positive direction again, so that the data voltage range previously used for the image display may be used as it is.

In the following, a process of completing the light emitting display device according to an embodiment is schematically reviewed through FIG. 14.

FIG. 14 is a view showing a step during a manufacturing of a light emitting display device in accordance with aspects of the present disclosure.

(A) of FIG. 14 shows a cutting step (a cell cut) by cutting a mother substrate 1 to be separated into individual display panels, (B) of FIG. 14 shows an aging step (a panel aging) of performing an aging, and shows applying a voltage to a pad of a display panel 10 during a manufacturing process by using an external voltage generator 11. (C) of FIG. 14 shows a visual inspection step (AVI) to check whether pixels are operated normally without problems (e.g., whether performance of the pixels meets target criteria), (D) of FIG. 14 shows a module process (a module) for attaching a driving chip (D-IC) and/or printed circuit board (PCB) to the display panel 10 during the manufacturing process, and (E) of FIG. 14 shows an optical compensation step of adjusting the data voltage corresponding to the display luminance by checking the displayed luminance by applying a signal and data voltage to each pixel. Expressed another way, the optical compensation step may include checking the displayed luminance by applying a signal and data voltage to each pixel, and further, adjusting the data voltage based on the displayed luminance.

Specifically, the cutting step of (A) of FIG. 14 is a step of separating the display panel 10 during the manufacturing process from the mother substrate 1, and may have a merit of reducing a manufacturing time and a cost as a plurality of display panels may be manufactured in one process.

In the aging step of (B) of FIG. 14, two types of aging may be performed, which may be divided into a TFT aging and an aging including the high-voltage aging described herein. After performing the TFT aging, the aging including high-voltage aging may be performed. In some embodiments, the TFT aging may be omitted or included.

In some aspects, the TFT aging may be implemented without using a high voltage. For example, for the TFT aging, 12V may be applied to the control electrode CG of the driving transistor T1, a voltage of 0V may be applied to the first region S of the driving transistor T1, and a voltage of −12V may be applied to the second region D. As the voltage flows to the driving transistor T1 for a certain period of a time, the reliability of the driving transistor T1 is improved.

In some aspects, the aging including the high-voltage aging includes the high-voltage aging of FIG. 4 or the high-voltage aging of FIG. 10 described herein and the aging of two stages may proceed. Therefore, in the high-voltage aging of (B) of FIG. 14, the voltage relationship applied to the driving transistor T1 during the high-voltage aging is only shown, but the additional aging may be further included such as FIG. 10.

(B) of FIG. 14 schematically shows applying a voltage to the pad of the display panel 10 during the manufacturing process by using an external voltage generator 11. Therefore, the aging process including the high-voltage aging of FIG. 4 and FIG. 10 is a method of applying a voltage to the test pad by using an external voltage generator 11 before manufacturing the light emitting display device, and is distinguished from the display operation in which the light emitting display device applies a voltage to the pixel for the display images.

The visual inspection step in (C) of FIG. 14 is a step of applying a signal to each pixel to check whether light is emitted, and may be performed automatically through a separate device. The visual inspection step in (C) of FIG. 14 may include checking whether there is a defect in the panel by checking whether the wiring is disconnected or shorted.

(D) of FIG. 14 shows the module process performed for a panel without defects through the step of (C) of FIG. 14. In the module process, the driving chip (D-IC) and/or the printed circuit board (PCB) may be attached to the display panel 10 during the manufacturing process to complete the state that may be display-operated by itself.

In some cases, although the dispersion is reduced through the high-voltage aging described herein, each pixel may have slightly different threshold voltage and output current. The optical compensation step in (E) of FIG. 14 is a step for applying the data voltage to the actual pixels and operating the pixels to check the luminance displayed by the pixels, and based on the luminance displayed by the pixels, determining the data voltage to be applied to each pixel to display a specific gray color. Since the dispersion of each driving transistor is reduced through the high-voltage aging described herein, the difference between the respective data voltages to be applied to the pixels may be minimized (e.g., the respective data voltages may not differ greatly). In addition, since the high-voltage aging has been performed, the characteristics of the driving transistor may remain consistent (e.g., may not change significantly) even with operation of the pixel over time.

After the above steps are completed, manufacturing of the light emitting display device is complete (the light emitting display device may be sold).

The transistors T1 and T2 included in a pixel in accordance with the examples described herein use polycrystalline silicon semiconductor. That is, for the polycrystalline silicon semiconductor, a deviation may occur in the crystallization process and the dispersion may occur relatively large, so the dispersion may be reduced through the high-voltage aging during the above manufacturing process. However, aspects of the present disclosure are not limited thereto. For example, dispersion as described herein may occur during a process even in an embodiment using an oxide semiconductor as a semiconductor layer. Aspects of the present disclosure support applying high-voltage aging described herein to transistors which include materials (e.g., an oxide semiconductor as a semiconductor layer) susceptive to dispersion so as to reduce the dispersion.

While this disclosure has been described in connection with what is presently considered to be practical embodiments, it is to be understood that the example aspects of the present disclosure are not limited to the disclosed embodiments. On the contrary, it is intended to cover various modifications and equivalent arrangements included within the spirit and scope of the appended claims.

<Description of symbols>

| | |
|---|---|
| 10: display panel | T1: driving transistor |
| T2: second transistor | CG: control electrode |
| FG: floating electrode | LED: light emitting diode |
| Cst: storage capacitor | DA: display area |
| ACT: semiconductor layer | S: first region |
| D: second region | 151: scan line |
| 171: data line | 172: driving voltage line |
| 173: storage voltage line | 179: driving low voltage line |
| 171-p: data pad | 172-p, 173-p, 179-p: test pad |
| 172-1, 173-1, 179-1: connection wiring | 110: substrate |
| 141: first insulating layer | 142: second insulating layer |
| 143: third insulating layer | CG-c, S-c, D-c: connecting electrode |
| SSD1, SSD2: scan signal generator | D-IC: driving chip |
| 11: external voltage generator | 1: mother substrate |

What is claimed is:

1. A light emitting display device comprising:

a driving transistor including a control electrode, a floating electrode, and a first electrode connected to a driving voltage line, and a second electrode;

a second transistor including a gate electrode, a third electrode connected to a data line, and a fourth electrode connected to the control electrode;

a storage capacitor including a first storage electrode and a second storage electrode connected to the control electrode; and a light emitting diode connected to the second electrode of the driving transistor, wherein the first storage electrode is directly connected to a storage voltage line electrically separate from the driving voltage line, wherein the light emitting display device is produced through a high-voltage aging process, such that:

a first dispersion value of the threshold voltage of the driving transistor prior to the high-voltage aging process is higher than a second dispersion value of the threshold voltage of the driving transistor following the high-voltage aging process.

2. The light emitting display device of claim 1, further comprising a set of pixels, wherein a pixel of the set of pixels consists of the driving transistor, the second transistor, the storage capacitor, and the light emitting diode.

3. The light emitting display device of claim 1, wherein:

the light emitting diode includes an anode and a cathode, the anode is connected to the second electrode of the driving transistor, and the cathode is connected to a driving low voltage line.

4. The light emitting display device of claim 3, comprising:

a data pad connected to the data line;

a first test pad associated with a driving voltage line and connected to the driving voltage line;

a second test pad associated with a storage voltage line and connected to the storage voltage line; and a third test pad associated with a driving low voltage line and connected to the driving low voltage line.

5. The light emitting display device of claim 4, wherein:

the data pad, the first test pad associated with the driving voltage line, the second test pad associated with the storage voltage line, and the third test pad associated with the driving low voltage line are positioned in a non-display area of the light emitting display device.

6. The light emitting display device of claim 5, further comprising:

a first connection wiring associated with the driving voltage line, wherein the first connection wiring connects the driving voltage line and the first test pad associated with the driving voltage line and is positioned in the non-display area;

a second connection wiring associated with the storage voltage line, wherein the second connection wiring connects the storage voltage line and the second test pad associated with the storage voltage line and is positioned in the non-display area; and a third connection wiring associated with the driving low voltage line, wherein the third connection wiring connects the driving low voltage line and the third test pad associated with the driving low voltage line and is positioned in the non-display area.

7. The light emitting display device of claim 6, further comprising:

a plurality of driving voltage lines connected to the first connection wiring associated with the driving voltage line, a plurality of storage voltage lines connected to the second connection wiring associated with the storage voltage line, and a plurality of driving low voltage lines connected to the third connection wiring associated with the driving low voltage line.

8. The light emitting display device of claim 1, further comprising:

a scan line connected to the gate electrode of the second transistor; and a scan signal generator connected to the scan line.

* * * * *